(12) United States Patent
Li et al.

(10) Patent No.: US 11,288,396 B2
(45) Date of Patent: Mar. 29, 2022

(54) DATA SECURITY THROUGH PHYSICAL SEPARATION OF DATA

(71) Applicant: International Business Machines Corporation, Armonk, NY (US)

(72) Inventors: Li Li, Cedar Park, TX (US); Barnabas Kadlecsik, Csokako (HU); Itzhack Goldberg, Hadera (IL); Su Liu, Austin, TX (US); Etai Lev Ran, Nofit (IL)

(73) Assignee: International Business Machines Corporation, Armonk, NY (US)

( * ) Notice: Subject to any disclaimer, the term of this patent is extended or adjusted under 35 U.S.C. 154(b) by 367 days.

(21) Appl. No.: 16/444,195

(22) Filed: Jun. 18, 2019

(65) Prior Publication Data

US 2020/0401723 A1  Dec. 24, 2020

(51) Int. Cl.
*G06F 21/62* (2013.01)

(52) U.S. Cl.
CPC ...... *G06F 21/6245* (2013.01); *G06F 21/6254* (2013.01)

(58) Field of Classification Search
CPC ... G06F 21/6245; G06F 21/64; G06F 21/6254
USPC .......................................................... 726/30
See application file for complete search history.

(56) References Cited

U.S. PATENT DOCUMENTS

| 5,485,474 | A | 1/1996 | Rabin |
| 7,272,613 | B2 | 9/2007 | Sim et al. |
| 7,865,172 | B2 | 1/2011 | Blair et al. |
| 8,495,700 | B2 | 7/2013 | Shahbazi |
| 8,832,493 | B2 | 9/2014 | Volvovski et al. |
| 9,235,350 | B2 | 1/2016 | Mark |
| 9,294,444 | B2 | 3/2016 | O'Hare et al. |
| 10,102,067 | B2 | 10/2018 | Kazi |
| 2002/0133491 | A1 | 9/2002 | Sim et al. |
| 2004/0019658 | A1 | 1/2004 | Plastina et al. |
| 2004/0039754 | A1 | 2/2004 | Harple, Jr. |
| 2007/0079083 | A1 | 4/2007 | Gladwin et al. |
| 2007/0249322 | A1 | 10/2007 | Benco et al. |
| 2007/0297610 | A1 | 12/2007 | Chen et al. |
| 2009/0150970 | A1 | 6/2009 | Hinds et al. |

(Continued)

FOREIGN PATENT DOCUMENTS

| CA | 2242833 A1 | 1/1999 |
| CN | 106161476 A | 11/2016 |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.

(Continued)

*Primary Examiner* — Jeffrey C Pwu
*Assistant Examiner* — Nega Woldemariam
(74) *Attorney, Agent, or Firm* — Jamar K. Ray

(57) ABSTRACT

A data security method may include storing user data to a first device and storing metadata corresponding to the user data to a second device. The method may further include making a first determination that at least one device selected from the group of the first device and the second device is not in communication with a third device. The method may further include disabling utilization of the user data in response to the first determination.

17 Claims, 5 Drawing Sheets

(56) References Cited

U.S. PATENT DOCUMENTS

| | | |
|---|---|---|
| 2011/0055178 A1 | 3/2011 | Mark |
| 2012/0166867 A1 | 6/2012 | Volvovski et al. |
| 2017/0124296 A1* | 5/2017 | Baldwin .............. G06Q 50/184 |
| 2018/0018227 A1 | 1/2018 | Kazi |

OTHER PUBLICATIONS

"Using GPFS Storage Pools," IBM, Updated Nov. 28, 2012, 2 pages https://www.ibm.com/developerworks/community/wikis/home?lang=en#!/wiki/General+Parallel+File+System+(GPFS)/page/Using+GPFS+Storage+Pools.

* cited by examiner

DATA SECURITY THROUGH PHYSICAL SEPARATION OF DATA

BACKGROUND

The present disclosure relates to data security, and more specifically, to limiting access to electronic data.

Various methods may be used to limit unauthorized access to electronic data. Such methods may include encryption, passwords, and authentication processes.

SUMMARY

A method may include storing user data to a first device. The method may further include storing metadata corresponding to the user data to a second device. The method may further include making a first determination that at least one device selected from the group of the first device and the second device is not in communication with a third device. The method may further include disabling utilization of the user data in response to the first determination.

A method may include storing user data to a first device. The method may further include wherein the user data has been separated from corresponding metadata. The method may further include wherein the corresponding metadata is not stored on the first device. The method may further include making a first determination that the first device is not in communication with a discrete device. The method may further include wherein the corresponding metadata is stored on the discrete device. The method may further include in response to the first determination, disabling utilization of the user data.

A method may include storing metadata to a second device. The method may further include wherein the metadata has been separated from user data to which the metadata corresponds. The method may further include wherein the user data is not stored on the second device. The method may further include making a first determination that the second device is not in communication with a discrete device. The method may further include wherein the user data is stored on the discrete device. The method may further include in response to the first determination, disabling utilization of the user data.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
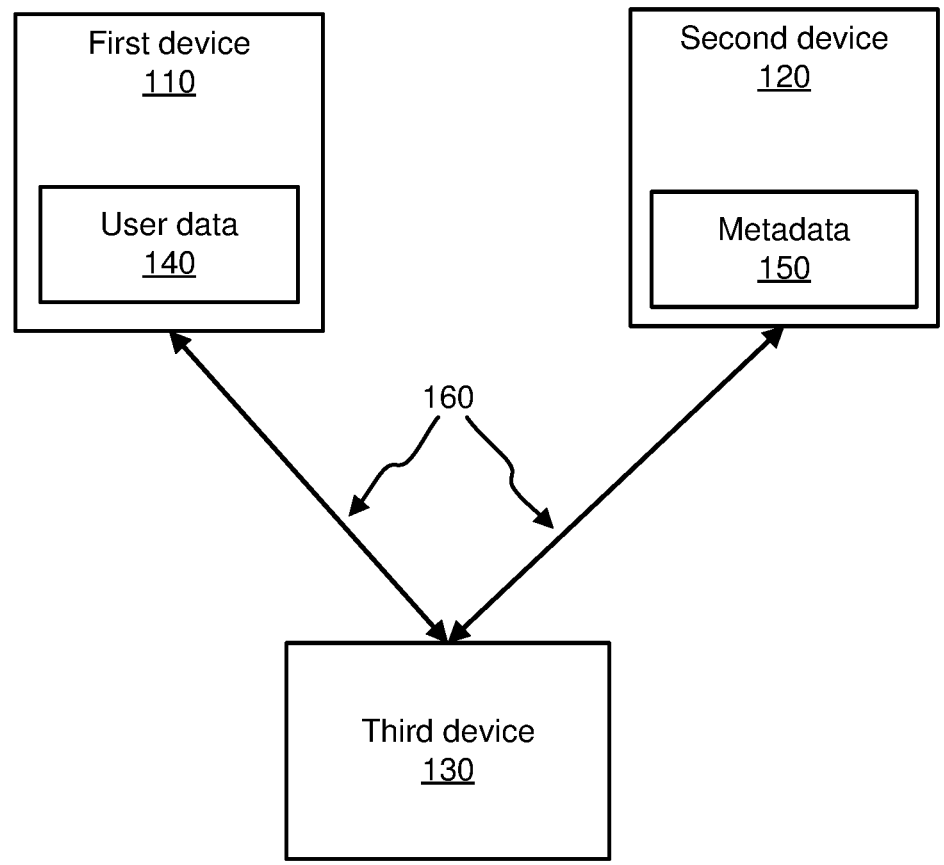
FIG. 1 depicts a system block diagram of a data security system, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to limiting access to data; more particular aspects relate to limiting access to electronic data by separating the data and storing the separated data onto more than one electronic device. While the present disclosure is not necessarily limited to such applications, various aspects of the disclosure may be appreciated through a discussion of various examples using this context.

Electronic devices, such as computers and mobile phones, may implement technology to prevent unauthorized access to data that is accessible by such electronic devices. This technology may include the use of passwords and/or encryption programs. Such technology may be inefficient to use or labor-intensive to develop. Such technology may also be subject to vulnerabilities that render the technology ineffective (e.g., the use of social engineering to obtain a password or the exploitation of a bug or backdoor in an encryption program).

To address these and other problems, embodiments of the present disclosure may include a process and system for limiting access to user data by separately storing the user data and its corresponding metadata on discrete electronic devices, so that the user data and its corresponding metadata are not stored on the same device. Embodiments of the present disclosure may further include conditioning access to the user data upon the ability of the discrete electronic devices to communicate with one another. The ability of an electronic device to construe, or interpret, user data may depend on its access to both the user data and metadata corresponding to the user data (e.g., a laptop computer may not be able to order and assemble user data blocks stored in various locations on a hard drive without having access to corresponding metadata that provides a name and location of each user data block on the hard drive). By storing user data on a first device and its corresponding metadata on a second device, embodiments of the present disclosure may restrict the ability of an electronic device to construe the user data by limiting access to the user data and/or its corresponding metadata.

Some embodiments of the present disclosure may include three discrete electronic devices, where both a first device and a second device communicate with a third device. In these embodiments, to construe user data, the third device may require communication with the first device to obtain the user data and communication with the second device to obtain the corresponding metadata. Some embodiments of the present disclosure may include two discrete electronic devices, where a third device may be the same device as either the first device or the second device. In embodiments in which the third device is the same device as the first device having user data, to construe the user data, the third device may require communication with the second device to obtain the corresponding metadata. In embodiments in which the third device is the same device as the second device having metadata corresponding to user data stored on the first device, the third device may require communication with the first device to obtain and construe the user data.

Turning to the figures, FIG. 1 illustrates a data security system 100 according to embodiments of the present disclosure. The data security system 100 may include a first device 110, a second device 120, and a third device 130. Each of the first device 110, the second device 120, and the third device 130 may be an electronic device configured to send and/or receive electronic data, such as a computer or server, mobile phone, tablet computer, or smart watch. In some embodiments, one or more of the first device 110, the second device 120, and the third device 130 may include a computer system, such as computer system 301 described with respect to FIG. 3. In some embodiments, the first device 110 and the second device 120 may establish a communication path 160 with the third device 130. In some embodiments, the communication path 160 may include a physical connection, such as a data cable. In some embodiments, the communication path may include wireless communication technology, such as a wireless network, NEAR FIELD COMMUNICATION ("NFC"), BLUETOOTH, or ZIGBEE.

In some embodiments, each of the first device 110, the second device 120, and the third device 130 may be a discrete electronic device. In some embodiments, the third device 130 may be the first device 110 or the second device 120. In some embodiments, the first device 110 and the second device 120 may be discrete electronic devices. For example, in some embodiments, the first device 110 may be a cloud server, the second device 120 may be a smart phone, and the third device 130 may be a laptop computer. Such embodiments include three discrete electronic devices: a cloud server, a smart phone, and a laptop computer. In some embodiments, the first device 110 may be a smart phone, the third device 130 may be the same smart phone as the first device 110, and the second device 120 may be a smart watch. Such embodiments include two discrete electronic devices: a smart phone and a smart watch. In some embodiments, the first device 110 may be a smart watch, the second device 120 may be a tablet computer, and the third device may be the same tablet computer as the second device 120. Such embodiments include two discrete electronic devices: a smart watch and a tablet computer.

The first device 110 may include user data 140. In some embodiments, user data 140 may be electronic data having corresponding metadata 150. For example, in some embodiments, user data 140 may include a set of data blocks that are stored within the first device 140, and corresponding metadata 150 may include information about the user data 140, such as the location of one or more data blocks of the set of data blocks on a hard drive or memory of the first device 140, or the size, structure, or name of one or more data blocks. Thus, in some embodiments, the user data 140 may be cumbersome or impossible to construe without access to the corresponding metadata 150. In some embodiments, the metadata 150 may be stored within the second device 120.

In some embodiments, access to both the user data 140 stored within the first device 110 and the corresponding metadata 150 stored within the second device 120 may be required to utilize (e.g., view, use, manipulate) the user data 140. For example, in some embodiments, an attempt to utilize the user data 140 without access to the corresponding metadata 150 may result in a stalled operation and/or an indication such as an error message. In some embodiments, such access to the corresponding metadata 150 may be provided by inter-device communication via the communication path 160. Thus, in some embodiments, the first device 110 storing the user data 140 and the second device 120 storing the metadata 150 may be required to communicate with the third device 130 before the user data 140 may be utilized. By requiring such inter-device communication, embodiments of the present disclosure may condition the utilization (e.g., use, viewing, or manipulation) of the user data 140 upon the ability of the first device 110 and the second device 120 to communicate with the third device 130. As a result, embodiments of the present disclosure may prevent or impede the utilization of the user data 140 when an entity, such as a device operator, does not have access to the first device 110, the second device 120, and the third device 130 to obtain both the user data 140 and the corresponding metadata 150.

For example, in some embodiments, the first device 110 may be a cloud server storing the user data 140; the second device 120 may be a smart watch storing the corresponding metadata 150; and the third device 130 may be a laptop computer. In this example, an authorized user may be the owner of the second device 120 (smart watch) and the third device 130 (laptop computer). The second device 120 (smart watch) and the third device 130 (laptop computer) may have a wireless communication path 160, such as a BLUETOOTH connection. Additionally, the first device 110 (cloud server) and the third device 130 (laptop computer) may have a communication path 160, such as a connection via the Internet. According to embodiments of the present disclosure, the data security system 100 may allow the authorized user to utilize the user data 140 on the third device 130 (laptop computer) so long as the third device 130 remains in communication with both the first device 110 (cloud server) to obtain the user data 140 and the second device 120 (smart watch) to obtain the corresponding metadata 150. Without such communication, the data security system 100 may respond to attempts by the third device 130 (laptop computer) to utilize user data 140 by causing the third device 130 to stall by executing a loop of requests to establish communication with both the first device 110 and the second device 120. Until such communication is established, the loop of requests may continue. For example, an unauthorized user may be a person who unlawfully possesses the third device 130 (laptop computer). The unauthorized user may establish communication between the third device 130 (laptop computer) and the first device 110 (cloud server); however, the unauthorized user may not have possession of or access to the second device 120 (smart watch) (e.g., the second device 120 may be outside of a required communication range of the third device 130 or the second device 120 may have its communication capability disabled). Thus, the unauthorized user may be unable to access the corresponding metadata 150 that is stored on the second device 120. Accordingly, third device 130 may prevent utilization of the user data 140 and display an error message each time the unauthorized user attempts to access the user data 140 via the third device 130.

In another example, in some embodiments, the first device 110 and the third device 130 may both be the same tablet computer storing the user data 140, and the second device 120 may be a smart phone storing the corresponding metadata 150. In this example, because the first device 110 and the third device 130 are the same device (a tablet computer) the first device 110 and the third device 130 are considered to have a communication path 160 between one another. Additionally, the third device 130 (tablet computer) and the second device 120 (smart phone) may have a communication path 160, such as a data cable. According to embodiments of the present disclosure, the data security system 100 may allow an authorized user to view the user data 140 stored on the third device 130 so long as the third device 130 remains in communication with the second device 120 via the communication path 160 to obtain the corresponding metadata 150. Additionally, in some embodiments, communication between the third device 130 and the second device 120 may require the data cable as well as correct passwords entered into each of the third device 130 and the second device 120. For example, if an unauthorized user obtains the third device 130 and attempts to view the user data 140 stored on the third device 130, such viewing may be prevented by the data security system 100 unless the unauthorized user provides the data cable between the third device 130 and the second device 120 as well as correct passwords entered into each of the third device 130 and the second device 120.

Accordingly, by separately storing user data 140 on a first device 110 and its corresponding metadata 150 on a second device 120 and requiring communication between both the first and third devices and the second and third devices, embodiments of the present disclosure may provide improved data security by conditioning the utilization of the user data 140 on at least two abilities: 1) an ability to access both the first device 110 and the second device 120 (e.g., via physical possession and/or a correct password) and 2) an ability to provide communication paths between the first device 110 and the third device 130 and between the second device 120 and the third device 130.

Figure 2:
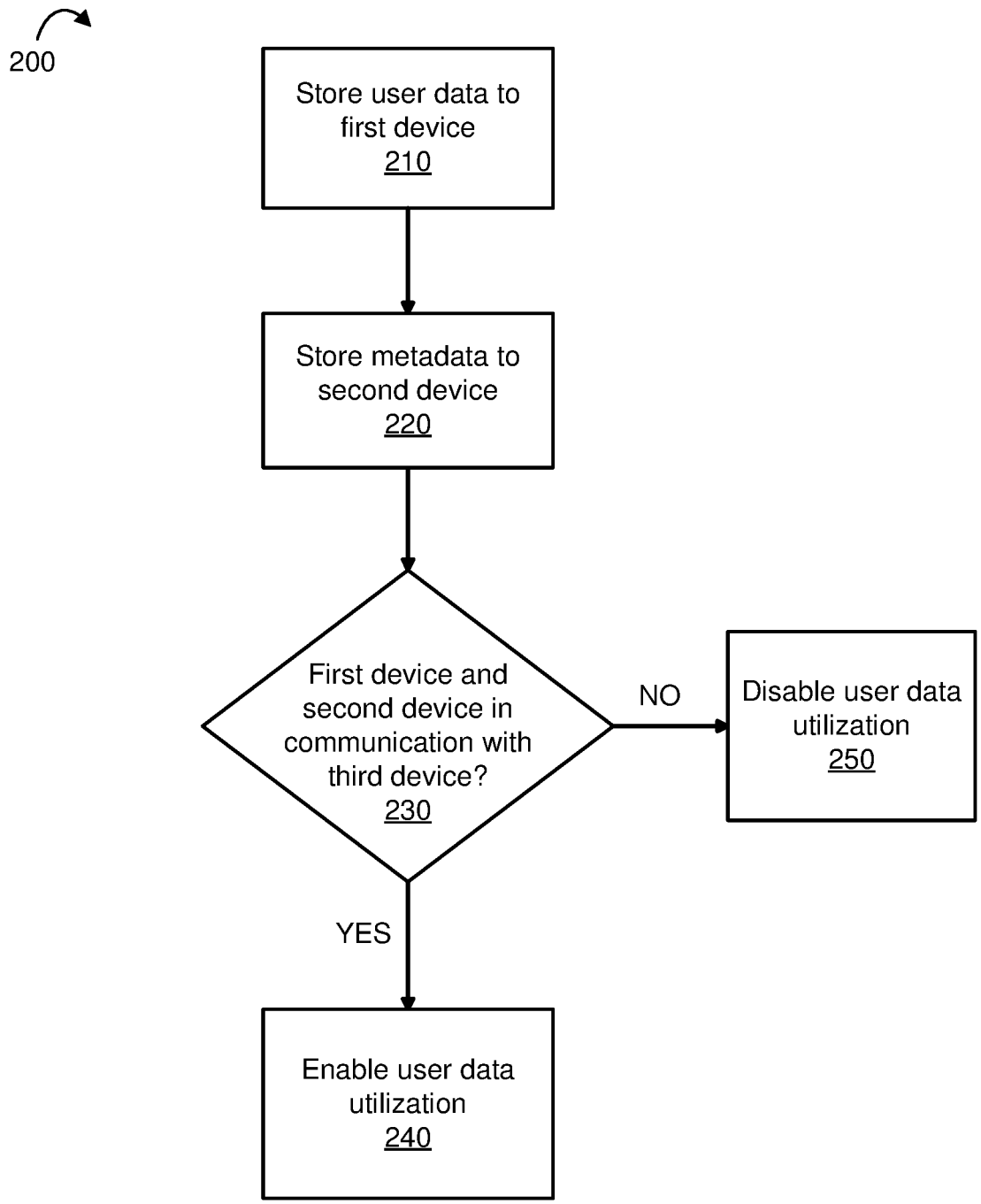
FIG. 2 depicts a flowchart of an example process for limiting data access, in accordance with embodiments of the present disclosure.

FIG. 2 is a flow diagram illustrating a process 200 for limiting access to user data, according to an illustrative embodiment of the present disclosure. The process 200 may be performed by a computer system, such as computer system 301 described with respect to FIG. 3.

Referring back to FIG. 2, in step 210, a data security system according to an embodiment of the present disclosure may electronically store user data to a first device. Such storage of the user data may include the data security system separating the metadata corresponding to the user data such that the corresponding metadata may be stored onto a second device. Thus, user data that has been separated from corresponding metadata may be user data that has been stored on a discrete device from a device to which the corresponding metadata is stored. For example, in some embodiments, the first device and the third device may be the same smart phone and a second device may be a smart watch. In this example, the smart phone may include application software having programming instructions to perform at least one of separating user data from its corresponding metadata, storing the user data onto the smart phone, and transferring the corresponding metadata to the smart watch for storage. In some embodiments, the first device may store, to the first device, user data obtained from the second device or the third device.

In step 220, the data security system may electronically store the metadata corresponding to the user data onto a second device. Such storage of the corresponding metadata may include the data security system separating the corresponding metadata from the user data. Thus, corresponding metadata that has been separated from user data may be corresponding metadata that has been stored on a discrete device from a device to which the user data is stored. For example, in some embodiments, the second device and the third device may be the same tablet computer, and the first device may be a desktop computer. In this example, the tablet computer may include software having programming instructions to perform at least one of separating user data from its corresponding metadata, storing the corresponding metadata onto the tablet computer, and transferring the user data to the desktop computer for storage. In some embodiments, the second device may store, to the second device, metadata obtained from the first device or the third device.

In another example, in some embodiments, the first device may be a cloud server, the second device may be a smart phone, and the third device may be a laptop computer. In this example, the laptop computer may include software having programming instructions to perform at least one of separating user data from its corresponding metadata, transferring the user data to the cloud server for storage, and transferring the corresponding metadata to the smart phone for storage.

In step 230, the data security system may determine whether the first device and the second device are in communication with a third device. In some embodiments, the determination may be accomplished by a process such as electronic handshaking between the devices. In embodiments in which the third device is either the first device or the second device, the data security system may determine whether 1) the first device/third device and the second device are in communication with one another or 2) the second device/third device and the first device are in communication with one another. In some embodiments, step 230 may include the data security system verifying that at least one pair of the first device and the third device and the second device and the third device is in communication via a predetermined communication path (e.g., a specific data cable owned by the device owner; a particular technology, such as a BLUETOOTH communication path; or a specific network, such as a device owner's home or office local area network). In such embodiments, the data security system may determine that devices are not in communication if the predetermined communication path is not used. For example, in some embodiments, a first device and a third device may both be the same laptop computer having wired and wireless communication capabilities. In this example, a second device may be a smart phone also having wired and wireless communication capabilities. In this example, the data security system may determine that the third device and the second device are not in communication with one another when the third device and the second device are not in communication via a specific data cable, regardless of whether the third device and the second device may be in communication via a wireless communication path. In this way, the data security system may further limit access to user data by including an additional condition (use of a specific communication path) that must be satisfied to utilize the user data.

In step 250, if the data security system has determined in step 230 that the requisite communication has not been established, the data security system may disable utilization of the user data. In some embodiments, disabling utilization of the user data may include the data security system blocking the ability of the third device to obtain user data from the first device and/or blocking the ability of the third device to obtain corresponding metadata from the second device. For example, in some embodiments, the data security system may include software having programming instructions to cause a third device attempting to access user data stored on a first device to stall until the requisite communication is established.

Step 250 may further include the data security system displaying one or more messages corresponding to the requisite communication not being established. The one or more messages may be displayed on at least one device selected from the group of the first device, the second device, and the third device. For example, in some embodiments, the first device may be a desktop computer storing user data, the second device may be a smart phone storing corresponding metadata, and the third device may be a tablet computer. In this example, if an unauthorized user possesses the third device (tablet computer) and attempts to access the user data stored on the first device (desktop computer) without establishing communication between the third device and the second device (smart phone), the security system may block access to the user data stored on the first device, cause an error message to be displayed on the third device, and cause a message indicating a failed attempt to access the user data to be displayed on the first device and/or the second device.

In step 240, if the data security system has determined in step 230 that the requisite communication has been established, the data security system may enable utilization of the user data. In some embodiments, enabling utilization of the user data may include the data security system allowing the third device to obtain user data from the first device and/or allowing the third device to obtain corresponding metadata from the second device. In some embodiments, step 240 may include the data security system permitting one or more of the first device, the second device, and the third device to access, view, use, and/or manipulate user data or corresponding metadata stored on a discrete device.

Figure 3:
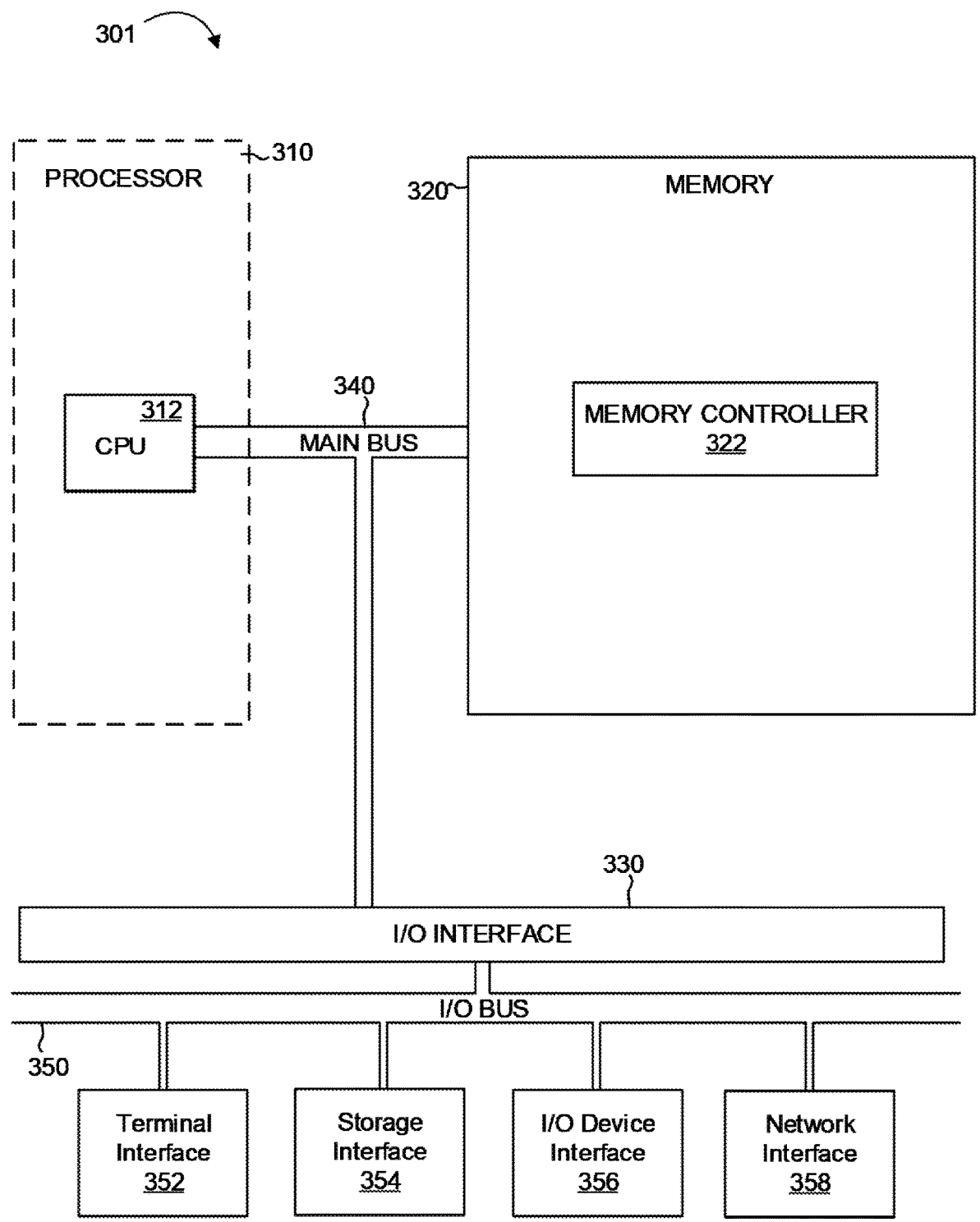
FIG. 3 depicts the representative major components of a computer system that may be used in accordance with embodiments of the present disclosure.

FIG. 3 depicts the representative major components of an exemplary Computer System 301 that may be used in accordance with embodiments of the present disclosure. The particular components depicted are presented for the purpose of example only and are not necessarily the only such variations. The Computer System 301 may comprise a Processor 310, Memory 320, an Input/Output Interface (also referred to herein as I/O or I/O Interface) 330, and a Main Bus 340. The Main Bus 340 may provide communication pathways for the other components of the Computer System 301. In some embodiments, the Main Bus 340 may connect to other components such as a specialized digital signal processor (not depicted).

The Processor 310 of the Computer System 301 may be comprised of one or more CPUs 312. The Processor 310 may additionally be comprised of one or more memory buffers or caches (not depicted) that provide temporary storage of instructions and data for the CPU 312. The CPU 312 may perform instructions on input provided from the caches or from the Memory 320 and output the result to caches or the Memory 320. The CPU 312 may be comprised of one or more circuits configured to perform one or methods consistent with embodiments of the present disclosure. In some embodiments, the Computer System 301 may contain multiple Processors 310 typical of a relatively large system. In other embodiments, however, the Computer System 301 may be a single processor with a singular CPU 312.

The Memory 320 of the Computer System 301 may be comprised of a Memory Controller 322 and one or more memory modules for temporarily or permanently storing data (not depicted). In some embodiments, the Memory 320 may comprise a random-access semiconductor memory, storage device, or storage medium (either volatile or non-volatile) for storing data and programs. The Memory Controller 322 may communicate with the Processor 310, facilitating storage and retrieval of information in the memory modules. The Memory Controller 322 may communicate with the I/O Interface 330, facilitating storage and retrieval of input or output in the memory modules. In some embodiments, the memory modules may be dual in-line memory modules.

The I/O Interface 330 may comprise an I/O Bus 350, a Terminal Interface 352, a Storage Interface 354, an I/O Device Interface 356, and a Network Interface 358. The I/O Interface 330 may connect the Main Bus 340 to the I/O Bus 350. The I/O Interface 330 may direct instructions and data from the Processor 310 and Memory 320 to the various interfaces of the I/O Bus 350. The I/O Interface 330 may also direct instructions and data from the various interfaces of the I/O Bus 350 to the Processor 310 and Memory 320. The various interfaces may comprise the Terminal Interface 352, the Storage Interface 354, the I/O Device Interface 356, and the Network Interface 358. In some embodiments, the various interfaces may comprise a subset of the aforementioned interfaces (e.g., an embedded computer system in an industrial application may not include the Terminal Interface 352 and the Storage Interface 354).

Logic modules throughout the Computer System 301—including but not limited to the Memory 320, the Processor 310, and the I/O Interface 330—may communicate failures and changes to one or more components to a hypervisor or operating system (not depicted). The hypervisor or the operating system may allocate the various resources available in the Computer System 301 and track the location of data in Memory 320 and of processes assigned to various CPUs 312. In embodiments that combine or rearrange elements, aspects of the logic modules' capabilities may be combined or redistributed. These variations would be apparent to one skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
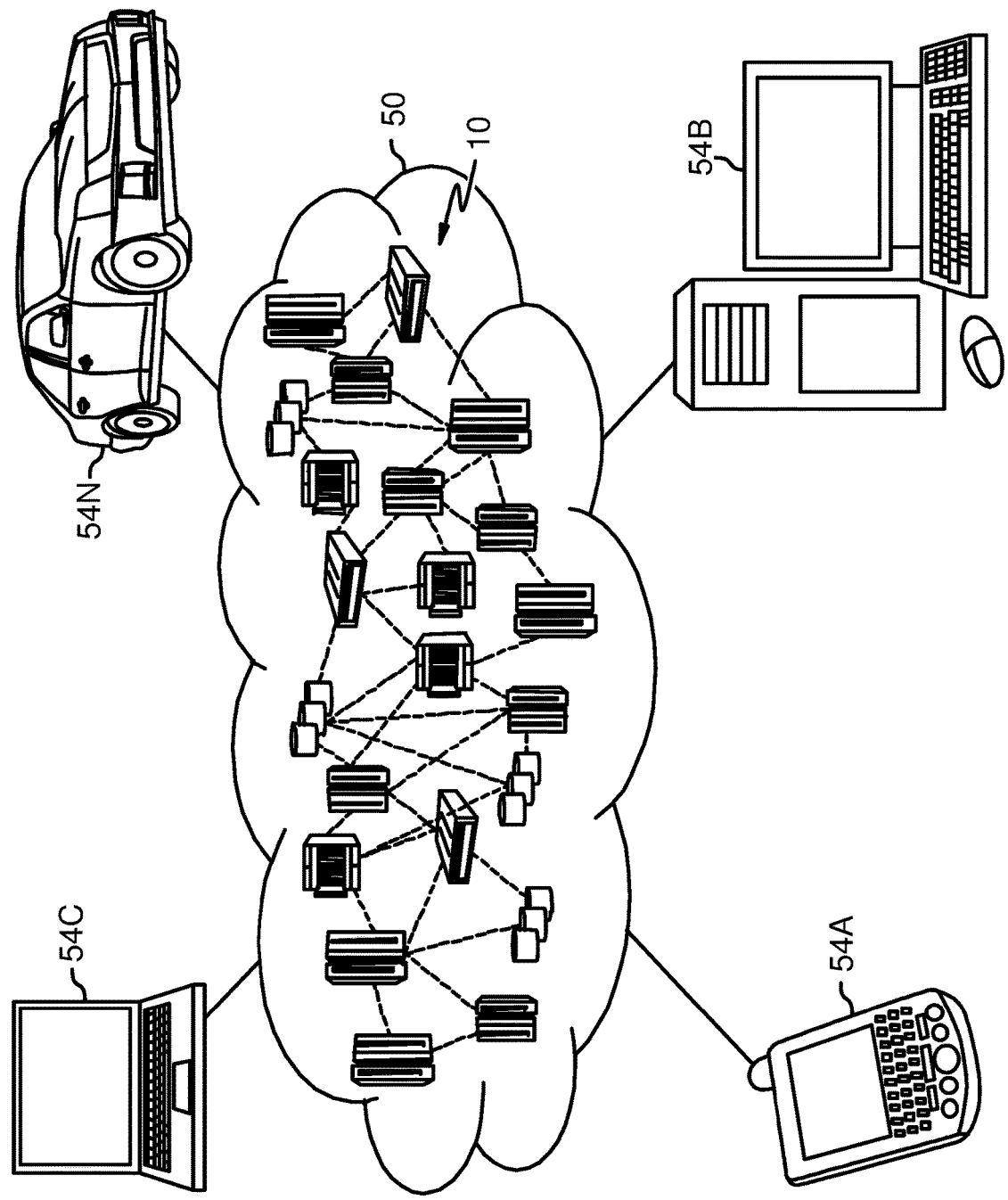
FIG. 4 depicts a cloud computing environment according to embodiments of the present disclosure.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
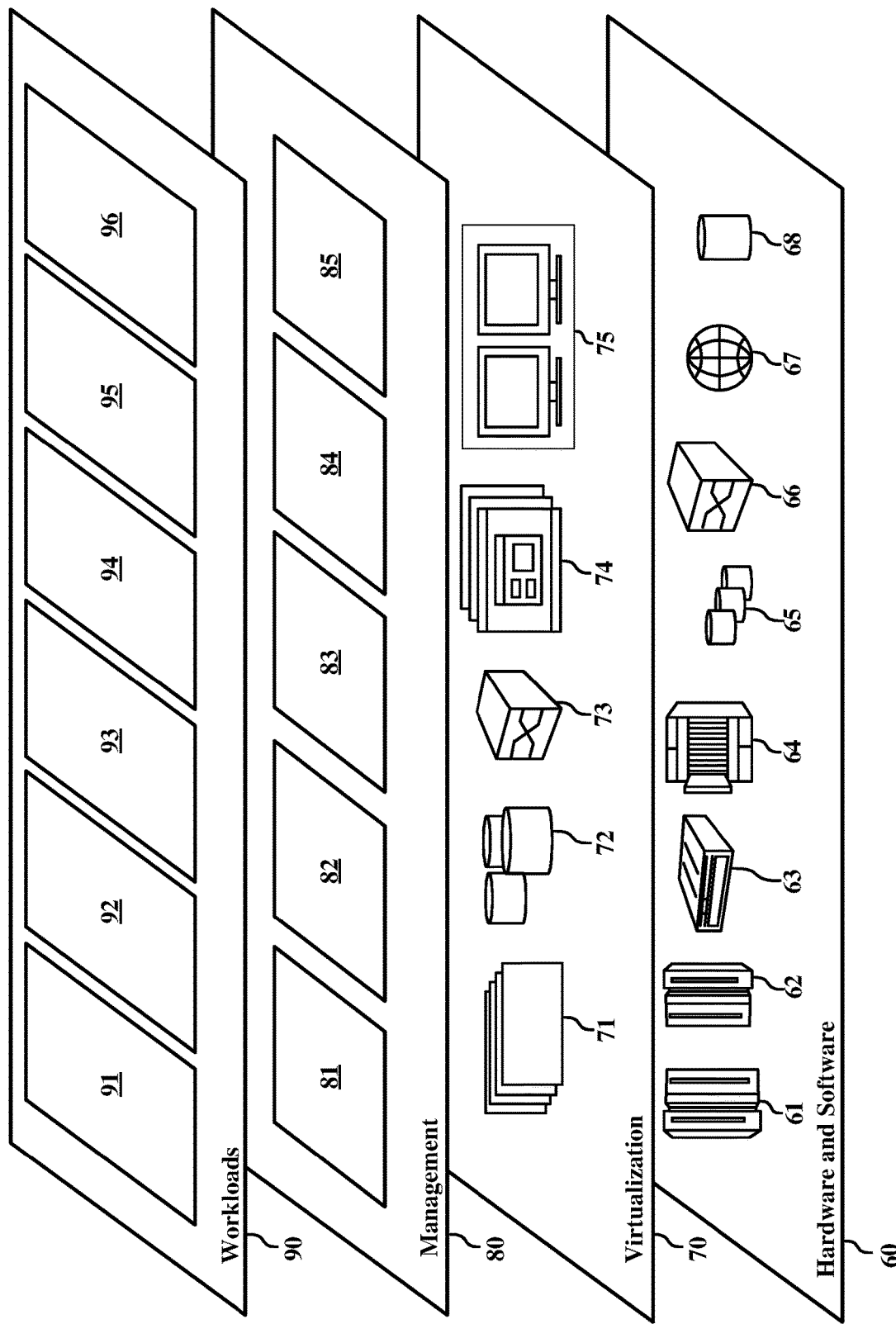
FIG. 5 depicts abstraction model layers according to embodiments of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data security logic 96.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   storing user data to a first device;
   storing metadata corresponding to the user data to a second device;
   making a first determination that at least one device selected from the group consisting of the first device and the second device is not in communication with a third device,
   wherein making the first determination comprises making a second determination that the at least one device is not using a predetermined communication path to communicate with the third device; and
   disabling utilization of the user data in response to the first determination, the disabling comprising displaying a message on at least one device selected from the group consisting of the first device, the second device, and the third device.

2. The method of claim 1, wherein the third device is the first device.
3. The method of claim 1, wherein the third device is the second device.
4. The method of claim 1, wherein the predetermined communication path is a predetermined data cable.
5. The method of claim 1, wherein the predetermined communication path is a predetermined network.
6. The method of claim 1, wherein the first device comprises a desktop computer, the second device comprises a smart phone, and the third device comprises a tablet computer.

7. A method comprising:
   storing user data to a first device,
   wherein the user data has been separated from corresponding metadata,
   wherein the corresponding metadata is not stored on the first device;
   making a first determination that the first device is not in communication with a discrete device,
   wherein making the first determination comprises making a second determination that the first device is not using a predetermined communication path to communicate with the discrete device,
   wherein the corresponding metadata is stored on the discrete device; and
   in response to the first determination, disabling utilization of the user data, the disabling comprising blocking an ability of the discrete device to obtain the user data from the first device.

8. The method of claim 7, wherein disabling utilization of the user data further comprises displaying on the first device a message corresponding to the first device not being in communication with the discrete device.
9. The method of claim 7, wherein the predetermined communication path is a predetermined data cable.
10. The method of claim 7, wherein the predetermined communication path is a predetermined network.
11. The method of claim 7, further comprising establishing communication with the discrete device; and
    enabling utilization of the user data.
12. The method of claim 7, further comprising establishing communication with the discrete device; and
    storing user data obtained from the discrete device to the first device.

13. A method comprising:
    storing metadata to a second device comprising a smart watch,
    wherein the metadata has been separated from user data to which the metadata corresponds,
    wherein the user data is not stored on the second device;
    making a first determination that the second device is not in communication with a discrete device comprising a tablet computer,
    wherein making the first determination comprises making a second determination that the second device is not using a predetermined communication path to communicate with the discrete device,
    wherein the user data is stored on the discrete device; and
    in response to the first determination, disabling utilization of the user data, the disabling comprising blocking an ability of the discrete device to obtain the corresponding metadata from the second device.

14. The method of claim 13, wherein disabling utilization of the user data further comprises displaying on the second device a message corresponding to the second device not being in communication with the discrete device.

15. The method of claim 13, wherein the predetermined communication path is a predetermined data cable.

16. The method of claim 13, wherein the predetermined communication path is a predetermined network.

17. The method of claim 13, further comprising establishing communication with the discrete device; and
enabling utilization of the user data.

* * * * *